US008119045B2

(12) United States Patent
Schmidt et al.

(10) Patent No.: US 8,119,045 B2

(45) Date of Patent: Feb. 21, 2012

(54) METHOD AND APPARATUS FOR TEST PRESSING MULTI-LAYER TABLETS OR COATED TABLETS

(75) Inventors: Ingo Schmidt, Schwarzenbek (DE); Ulrich Gathmann, Hamburg (DE); Bernd Malner, Schwarzenbek (DE)

(73) Assignee: Fette GmbH, Schwarzenbek (DE)

( * ) Notice: Subject to any disclaimer, the term of this patent is extended or adjusted under 35 U.S.C. 154(b) by 893 days.

(21) Appl. No.: 11/352,616

(22) Filed: Feb. 13, 2006

(65) Prior Publication Data

US 2006/0186568 A1 Aug. 24, 2006

(30) Foreign Application Priority Data

Feb. 19, 2005 (DE) ........................ 10 2005 007 790

(51) Int. Cl.

| | |
|---|---|
| ***D04H 1/20*** | (2006.01) |
| ***D04H 1/16*** | (2006.01) |
| ***B29B 9/00*** | (2006.01) |
| ***E04B 1/16*** | (2006.01) |
| ***B28B 5/00*** | (2006.01) |
| ***B29C 63/00*** | (2006.01) |
| ***B29C 65/00*** | (2006.01) |
| ***B29C 69/00*** | (2006.01) |
| ***G01N 3/08*** | (2006.01) |

(52) U.S. Cl. ............. 264/113; 264/112; 264/6; 264/35; 264/241; 73/824

(58) Field of Classification Search .................. 264/112, 264/113, 6, 35, 60, 241; 73/824

See application file for complete search history.

(56) References Cited

U.S. PATENT DOCUMENTS

| | | | | |
|---|---|---|---|---|
| 2,996,756 | A * | 8/1961 | Korsch et al. | 425/145 |
| 4,139,589 | A * | 2/1979 | Beringer et al. | 264/250 |
| 4,396,564 | A * | 8/1983 | Stuben et al. | 264/40.5 |
| 4,680,158 | A * | 7/1987 | Hinzpeter et al. | 264/40.5 |
| 5,145,693 | A * | 9/1992 | Hinzpeter et al. | 425/149 |
| 5,223,192 | A * | 6/1993 | Hinzpeter et al. | 264/40.5 |
| 5,350,548 | A * | 9/1994 | Hinzpeter et al. | 264/40.4 |
| 6,319,435 | B1 * | 11/2001 | Hinzpeter et al. | 264/40.1 |
| 6,979,187 | B2 * | 12/2005 | Hinzpeter et al. | 425/135 |
| 7,014,443 | B2 * | 3/2006 | Hinzpeter et al. | 425/167 |
| 7,125,234 | B2 * | 10/2006 | Scholz et al. | 425/167 |
| 2002/0004472 | A1 * | 1/2002 | Holderbaum et al. | 510/290 |

FOREIGN PATENT DOCUMENTS

| | | |
|---|---|---|
| DE | 103 19 024 B3 | 8/2004 |
| EP | 0 572 816 A1 | 6/1993 |

* cited by examiner

*Primary Examiner* — Khanh P Nguyen
*Assistant Examiner* — Matthew Hoover
(74) *Attorney, Agent, or Firm* — Vidas, Arrett & Steinkraus

(57) ABSTRACT

The invention relates to a method for test pressing tablets with at least two layers.

6 Claims, 2 Drawing Sheets

METHOD AND APPARATUS FOR TEST PRESSING MULTI-LAYER TABLETS OR COATED TABLETS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The invention relates to a method for test pressing tablets consisting of at least two layers.

As is generally known, rotary tablet presses comprise a rotor driven by a rotary drive, said rotor has a die plate, upper punches and lower punches, which are guided in suitable guides, and a control cam system. Moreover, at least one press station is provided, which is usually comprised of an upper pressure roller and a lower pressure roller, by means of which upper punches and lower punches are pressed into the die, as they pass the press station. Usually, two pairs of pressure rollers are provided for pre-pressing and final pressing of the material. Finally, a filling device is provided, by means of which the material to be compressed is filled into the die bores. The rotor is set in rotation continuously, whereby the filling device permanently fills material into the associated die bores and the associated lower punch ejects the finished, pressed tablets out of the die bore, from where they are directed into a channel by means of a wiper.

It is also known to produce multi-layer tablets with such a rotary tablet press. The multi-layer tablets are produced during one revolution of the rotor, whereby one filling device and one pressure roller arrangement (press station) are provided per layer. If for example a three-layer tablet is manufactured, three filling devices in a spacing of 120° degrees are provided as well as three press stations with at least one pair of pressure rollers between the filling devices.

Moreover, it is known to produce so-called coated tablets by means of a rotary press. The term "coated tablet" usually identifies a two-layer tablet, in which between the layers a core is disposed. After filling in and pressing of the first layer, a core of a different material is placed on the first layer and thereon, a second layer is filled in. When producing such coated tablets, one can proceed in different ways. It is possible to fill in the first layer and to perform the pressing not before the second layer has also been filled in. In the alternative, the first layer can be pressed before the core is inserted. Thereafter, the compression of both layers with the core is performed. Finally, it is also possible to press the core to a certain extent into the first layer following insertion. This can be accomplished with the upper punch in the press station as well. The described processes can be executed during one revolution of the rotor.

It is known to provide such a tablet press with a measurement device, which records important data during production and further processes the data in an operating computer. These data comprise the rotational speed of the rotor, the maximum pressing forces in the press station and—if applicable—the course of the pressing force in the press station, namely associated to the individual pairs of punches. By means of retrospective measurement of the ejected tablets with respect to weight, thickness and hardness, it is determined whether the desired parameters were achieved. If not, the filling quantity, pressing force or other parameters need to be adjusted. Devices and methods for controlling or regulating of the tablet presses in order to achieve optimal results are known from the prior art.

During the development of tablets, among other things, the compression characteristics of the material to be compressed are determined. To this end, at the beginning, only very little quantities of the product are available, which may be very costly and time-consumingly to produce and which may require costly material, so that the product losses during the pressing process need to be minimized. It is known to perform test pressings with special laboratory presses. In most cases, smaller eccentric presses are used, which can manufacture one tablet in each pressing process. It is a disadvantage that these laboratory presses have a different pressing behavior than rotary tablet presses, which are used for production. By nature, test pressings with a production rotary press have the advantage that the data determined in the tests can be transferred directly to the production. A disadvantage is that a filling device as is normally used needs to be filled permanently and evenly, in order to have a sufficient volume with a basic amount of pressing material, even if only a small number of tablets is produced. From DE 103 19 024 B3 a method for test pressing tablets with a rotary tabletting machine has become known, wherein a pair of selected punches for a single pressing is moved automatically into a filling position, and at least one die is filled with the material to be compressed. Afterwards, the rotor is set in rotation and is accelerated such that it has the desired production speed in the press station. After one rotation, the rotor is stopped in the filling position. During the revolution of the rotor, signals or courses of signals of the measuring points are recorded and transferred to a computer for display and analysis.

The conditions that have been described in combination with test presses for tablets, occur in an aggravated manner during test pressings of multi-layer tablets or coated tablets, respectively. As has been mentioned, a rotary press for multi-layer tablets needs several filling stations and press stations, dependent upon the number of layers of the tablet.

Therefore, the invention is based on the problem to provide a method for test pressing of multi-layer tablets or coated tablets, respectively, which can on the one hand be performed under production conditions, and on the other hand requires only little amounts of pressing material.

According to the inventive method, the rotor is provided with only one pair of punches and by means of the operating computer and control computer, the rotor can be moved into a defined filling position, in which the pair of punches is placed in this position. The lower punch is disposed in a first filling position, while the ejection cam is disposed in an inactive position. The die is filled with the material for the first layer. It shall be mentioned that the pressure rollers in the press station have taken a first pressing position. The adjustment of the cams and of the pressure rollers is accomplished by means of suitable adjustment drives, for example a hydraulic, pneumatic, or electromechanical drive. Afterwards, the rotor is rotated by one revolution, until the pair of punches has again reached the filling position. Thereby, a pressing of the first layer of the multi-layer tablet has been performed. Because the ejection cam was located in an inactive position, the first layer is not ejected, but remains in the die bore. After the filling position has been reached again, the filling cam is moved in a position in which a dosed filling of the second layer of the multi-layer tablet can be performed. Before a second revolution of the rotor, the pressure rollers are moved into a second pressing position. Moreover, the ejection cam is moved into an ejecting position, when only a two-layer tablet shall be produced. During the second revolution of the rotor, in this way the second layer of the tablet is pressed and the two-layer tablet is ejected by the associated lower punch and the ejection cam. Accordingly, n-revolutions of the rotor are required in order to produce a multi-layer tablet with n-layers, that is one revolution per layer, each with an individual adjustment of the cams and the pressure rollers.

If a three-layer tablet is produced, three revolutions of the rotor with the steps described above are required. Not until the third revolution, the ejection of the three-layer tablet by means of the lower punch is performed.

During the specific revolutions of the rotor, the signals of the single measuring points, for example for the pressing force, are recorded and transferred to an operating computer for display and analysis. The signals measured serve for example for a determination of the compression characteristics of the pressing material.

By means of a suitable computer control, it is also possible to produce automatically several multi-layer tablets in a row, wherein the described process parameters can be adjusted and modified automatically following each revolution. The number of layers of the tablet is theoretically unlimited.

The method for producing a coated tablet works similar to the method according to patent claim 1. At first, a first layer is filled in and preferably "pre-pressed". At the next stop following one revolution of the rotor, the core is inserted. This core may be pressed a bit into the lower layer by means of the upper punch. However, it is also possible to first place the core and then to fill in the second layer into the filling station, at the same stop of the rotor. Afterwards, the rotor executes one revolution, during which both layers together with the core are compressed to the final tablet. Thereafter, as has been described above, the ejection of the coated tablet is performed.

The filling-in of the material to be compressed and of the core can be performed by hand. However, it is also possible to provide a filling device. To this end, one embodiment of the invention is provided with a filling device with is rotatable about a vertical axis, said filling device exhibiting one chamber for receiving a layer material per layer of the multi-layer tablet. When the filling device is rotated, by means of for example a rotary drive, each time one filing outlet of a chamber is aligned with a die bore in the filling position.

The inventive method has a number of advantages. Test pressings could be performed with a rotor configured with only one pair of punches and with or without blank dies. Changeover times for different materials to be compressed or different types of punches, respectively, are very short. There is only little formation of dust during the test pressings, because only little amounts of material are used.

The product losses are very small, because each time only one die bore is filled with the layer material. All settings relevant for the process can be adjusted and tested in the test pressings: Rotational speed of the rotor, pressing force in the press station, thickness, hardness and weight of the tablets, and so on. The data determined in the test pressings and the different settings can be transferred directly to a production rotary press, for example the rotational speed, the pressing force, thickness, hardness and weight of the tablets, and so forth. The measurement data for each pressing process are available directly and can be displayed, analyzed and stored together with all data relevant for the process in the operating computer.

BRIEF DESCRIPTION OF THE SEVERAL VIES OF THE DRAWINGS

In the following, the invention is explained in greater detail based on an embodiment.

DETAILED DESCRIPTION OF THE INVENTION

Figure 1:
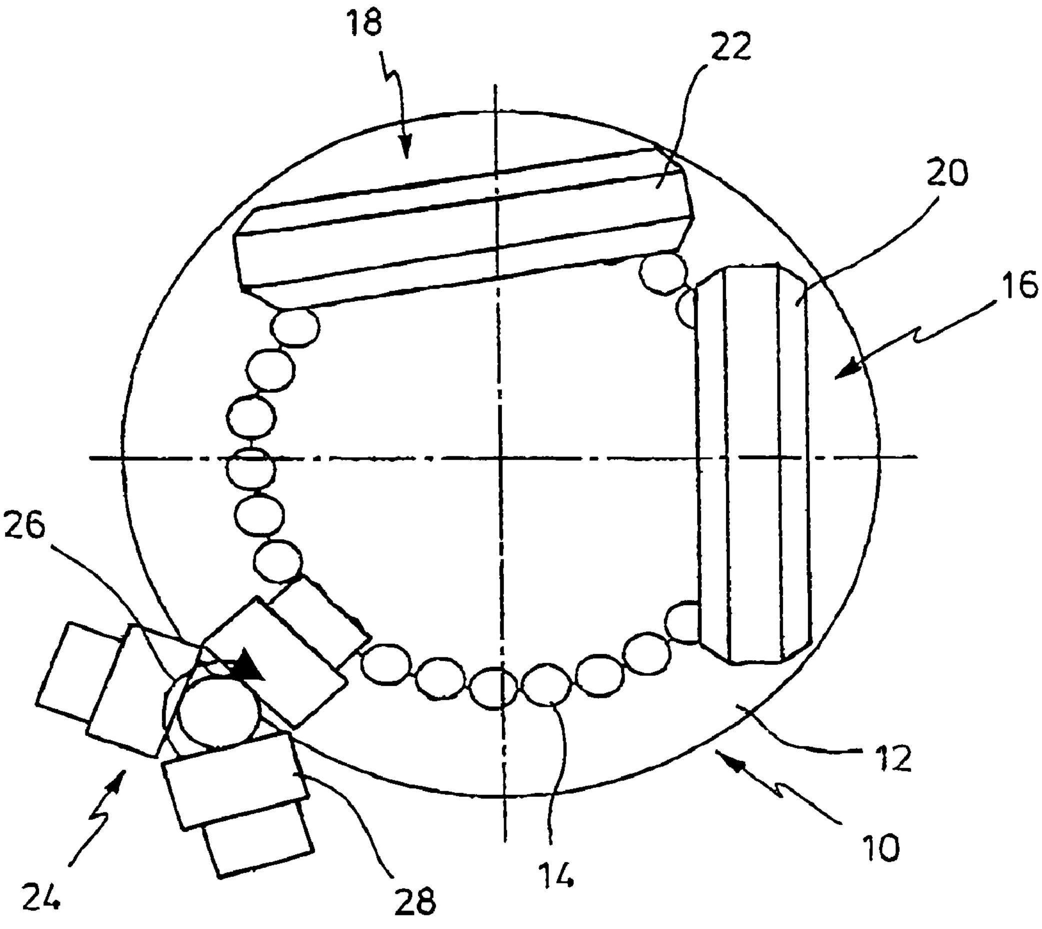
FIG. 1 shows a top view on a press station and a rotor of a rotary tablet press according to the invention.

While this invention may be embodied in many different forms, there are described in detail herein a specific preferred embodiment of the invention. This description is an exemplification of the principles of the invention and is not intended to limit the invention to the particular embodiment illustrated In FIG. 1 a rotor 10 of a rotary tablet press is indicated with a die-plate 12, which exhibits a plurality of die bores 14 on a divided circle. The rotor 10 is driven by a suitable rotary drive, which is controlled by an operating computer and control computer (not shown). Associated to the rotor 10, there are two press stations 16, 18 with upper and lower pressure roller, whereas in each case only an upper pressure roller 20 or 22, respectively, can be seen. With the help of the pairs of pressure rollers, the upper and lower punches are pressed into the die bores 14, in order to compress the material disposed in the die bore, as the upper and lower punches pass above or beneath the pressure rollers, respectively.

According to the invention, only one pair of punches is associated to the rotor, namely an upper and a lower punch, which are in turn associated to only one die bore 14. However, the pair of punches is not shown in FIG. 1.

A filling device 24 is associated to the rotor 10. The filling device is rotatable about a vertical axis, as is indicated by the arrow 26. The rotation can be performed with the help of a suitable rotary drive, which is not depicted here. The filling device 24 exhibits three filling chambers 28 disposed in a spacing of 180° degrees. The filling outlets of the filling device can be aligned with a die bore 14 dependent on the rotary position. For the production of a three-layer tablet, each filling chamber 28 is filled with material for one layer of the three-layer tablet.

Figure 2:
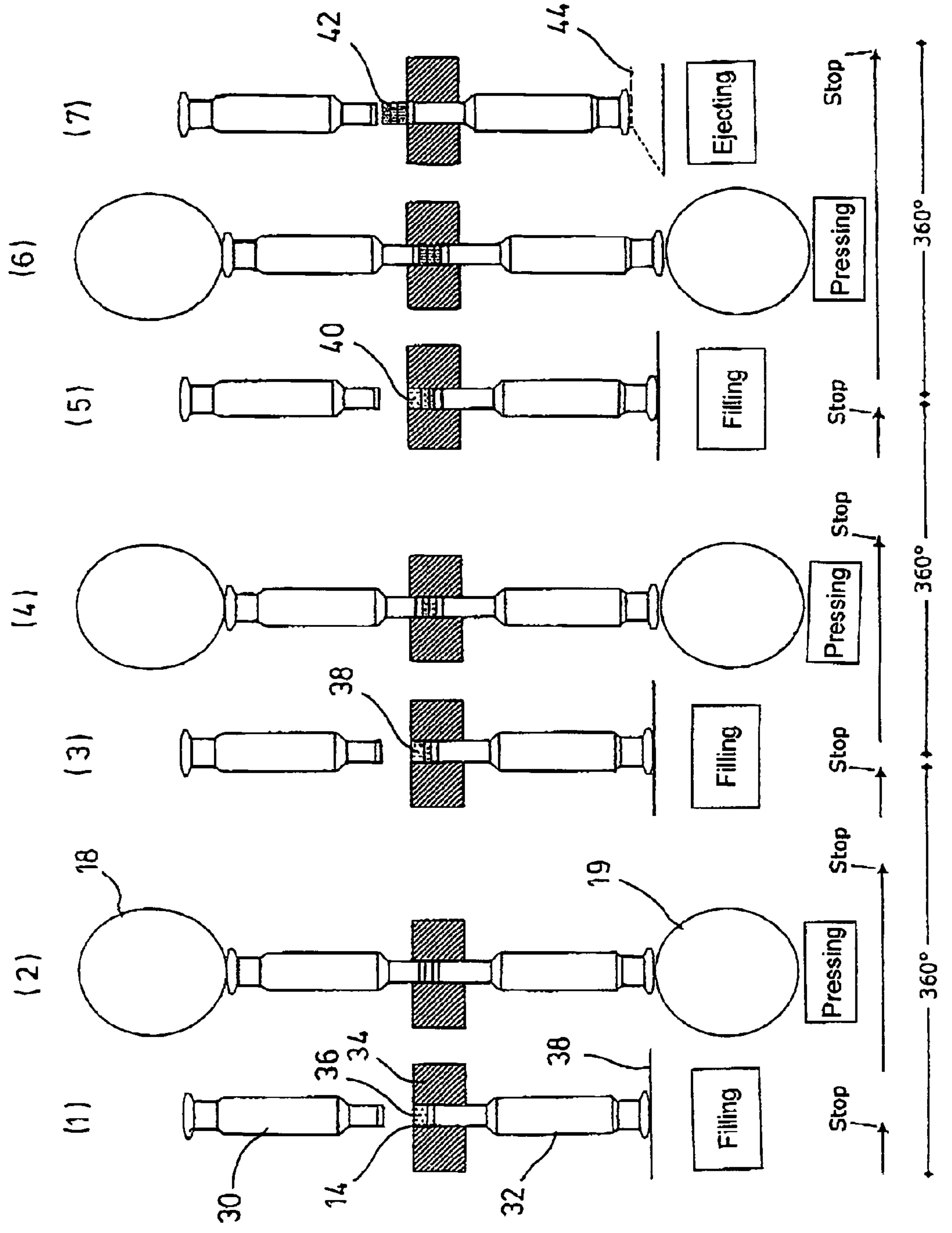
FIG. 2 shows schematically the production of a three-layer tablet with the rotary press of FIG. 1 in an unwinded view.

In FIG. 2 the pair of pressing punches mentioned above is depicted seven times. The upper punch is marked by 30 and the lower punch by 32. One further notices the die 34 with the die bore 14, to which the punches 30, 32 are associated. The seven positions shown in FIG. 2 correspond to three revolutions of the rotor 10. In the position 1 the pair of punches 30, 32 is disposed in the filling position, and the rotor 10 is standing still. By hand or with the help of the filling device 24 of FIG. 1, a first quantity 36 of material is filled into the die bore 14. The quantity is therefore pre-determined by the position of the lower punch 32, which is moved into the desired position by the filling cam 38. In the positions 2, 4 and 6, the pressing process occurs, in which the pressing punches 30, 32 pass between the upper pressure roller 18 and the lower pressure roller 19 (for simplicity, in FIG. 2 the pair of pressure rollers of the press station 16 in FIG. 1 has been omitted). Thus, in position 2 the first layer of a three-layer tablet is pressed. After the first revolution, the rotor 10 is again stopped in the filling position of the pressing punches 30, 32 and filling with the material 38 for the second layer is carried out. In the position 4, the second layer is compressed, and in position 5 the filling with a third layer of material 40 is performed. This third layer of material is also compressed in the position 6 in order to form a multi-layer tablet, which is indicated by 42 in position 7, and ejected from the die bore by the lower punch 32. To this end, an ejection cam 44 is provided.

Before each filling process or each pressing process, respectively, the filling cam 38 and the pressure rollers 18, 19 are adjusted in a desired manner in order to provide the pressing parameters required. The adjustment is performed with the help of suitable adjustment drives, which are not shown here. However, it is to be understood that dependent on the number of desired revolutions, an adjustment may well be performed before the next revolution of the rotor and the next pressing process. The ejection cam 44 exhibits an adjustment drive as well (not shown), which sets the ejection curve 44 during the first two revolutions according to FIG. 2 in an inactive position, in order to prevent an ejection of the previously pressed layers.

The control of the individual adjustment drives and the rotary drive for the rotor 10 and the filling device 24 is performed by an operating computer and control computer such that further two respective programming or before adjustment, these processes are executed automatically. A suitable measurement device which is not shown here, registers different process parameters, for example the rotational speed of the rotor 10, the pressing force at the pressure rollers 18, 19 and so forth, which can then be processed in the operating computer in a suitable manner, for example in order to perform changes of the settings prior to the next test pressing.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for test pressing tablets consisting of n layers in a rotary tablet press, said rotary press having a rotationally driven rotor, the rotor having only a single pair of punches associated therewith, the single pair of punches comprising one upper punch and one lower punch, the rotary press further having a plurality of die bores, punch guides, at least one press station and a control cam system, wherein the control cam system has a filling cam and an ejection cam for the lower punch, and wherein pressure rollers of the press station and the cams are adjustable in height by suitable adjustment drives, the method comprising:

moving the rotationally driven rotor and the single pair of upper and lower punches to a defined filling position and then stopping the rotor;

filling the die bore, which is associated with the pair of punches with material for a first layer of a tablet;

moving the filling cam into a first position, the ejection cam into a lower position, and the pressure rollers into a first pressing position by means of associated adjustment drives;

rotating the rotor by a full revolution;

testing, without ejecting the tablet, a first layer of the n layer tablet during the rotation of the rotor and then stopping the rotor;

stopping the single pair of punches in the filling position;

adjusting the filling cam to a second filling position;

adjusting the pressure rollers to a second pressing position;

thereafter filling the one die bore containing the first layer with material for a second layer;

rotating the rotor by a further full revolution and then stopping the rotor;

stopping the single pair of punches again in the filling position; and repeating the foregoing steps until at the n-th revolution of the rotor, the lower punch ejects the multi-layer tablet by the ejection cam in an ejection position.

2. The method according to claim 1, wherein during testing, pressing force values are recorded and transferred online to an operating computer for the rotary tablet press.

3. The method according to claim 1, wherein a drive means for the rotor is dimensioned such that it operates in a range of the press station.

4. A method for test pressing tablets consisting of n layers in a rotary tablet press, comprising:

providing a rotary table press having a rotationally driven rotor, the rotor having only a single pair of punches associated therewith, the single pair of punches comprising one upper punch and one lower punch, the rotary press further having die bores, punch guides, at least one press station and a control cam system, wherein the control cam system includes, a filling cam and an ejection cam for the lower punch, and wherein pressure rollers of the press station and the cams are adjustable in height by suitable adjustment drives; and providing a control computer for controlling the rotary tablet press, wherein the control computer is programmed such that the single pair of punches is automatically movable in a defined filling position, in which the lower punch is movable into a desired filling position by means of its filling cam and the ejection cam is movable to an inactive position by its adjustment drive, and wherein the control computer is configured to test each layer of the n layer tablet prior to ejection of the tablet.

5. The method of claim 4, wherein a filling device is provided which is rotatable about a vertical axis, and which exhibits one chamber per layer for receiving a layer material, and wherein a filling outlet of a chamber can be aligned with a die bore in the filling position, when the filling device is rotated.

6. The method of claim 5, wherein a rotary drive for the filling device is provided, which is controllable by an operating computer and control computer.

* * * * *